(12) United States Patent
Okouneva et al.

(10) Patent No.: US 11,608,112 B2
(45) Date of Patent: Mar. 21, 2023

(54) VEHICULAR TRAILERING ASSIST SYSTEM WITH TARGETLESS CALIBRATION OF TRAILER CAMERAS

(71) Applicant: Magna Electronics Inc., Auburn Hills, MI (US)

(72) Inventors: Galina Okouneva, Markham (CA); James Turk, Oakville (CA); Anam M. Yunus, Markham (CA); Alexander Velichko, Toronto (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 278 days.

(21) Appl. No.: 17/247,616

(22) Filed: Dec. 18, 2020

(65) Prior Publication Data
US 2021/0197893 A1 Jul. 1, 2021

Related U.S. Application Data

(60) Provisional application No. 62/953,617, filed on Dec. 26, 2019.

(51) Int. Cl.
| | |
|---|---|
| *B60D 1/30* | (2006.01) |
| *B60D 1/01* | (2006.01) |
| *B62D 13/02* | (2006.01) |
| *G06V 20/40* | (2022.01) |
| *G06V 20/56* | (2022.01) |

(52) U.S. Cl.
CPC ............ *B62D 13/025* (2013.01); *B60D 1/01* (2013.01); *B60D 1/30* (2013.01); *G06V 20/40* (2022.01); *G06V 20/56* (2022.01)

(58) Field of Classification Search
CPC ...... B62D 13/025; G06V 20/40; G06V 20/56; B60D 1/01; B60D 1/30
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 9,085,261 B2 | 7/2015 | Lu et al. |
| 9,446,713 B2 | 9/2016 | Lu et al. |
| 9,558,409 B2 | 1/2017 | Pliefke et al. |
| 10,086,870 B2 | 10/2018 | Gieseke et al. |
| 10,160,382 B2 | 12/2018 | Pliefke et al. |
| 10,532,698 B2 | 1/2020 | Potnis et al. |

(Continued)

*Primary Examiner* — Mathew Franklin Gordon
(74) *Attorney, Agent, or Firm* — Honigman LLP

(57) ABSTRACT

A vehicular trailering assist system includes at least one camera disposed at a trailer hitched to a hitch of a vehicle, and an electronic control unit (ECU). The ECU determines, during a first stage of a calibration maneuver of the vehicle and trailer, image coordinates of at least one ground feature point. The ECU, responsive to determining image coordinates of the at least one ground feature point, estimates orientation parameters of the camera based at least on the determined image coordinates and known intrinsic camera parameters. Responsive to estimating the orientation parameters of the camera, and based on the determined parameters of the camera, the ECU determines location of the at least one camera at the trailer.

20 Claims, 3 Drawing Sheets

(56) References Cited

U.S. PATENT DOCUMENTS

| | | |
|---|---|---|
| 10,552,976 B2 | 2/2020 | Diessner et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 2017/0254873 A1 | 9/2017 | Koravadi |
| 2018/0215382 A1 | 8/2018 | Gupta et al. |
| 2018/0276838 A1 | 9/2018 | Gupta et al. |
| 2019/0039649 A1 | 2/2019 | Gieseke et al. |
| 2019/0064831 A1 | 2/2019 | Gali et al. |
| 2019/0118860 A1 | 4/2019 | Gali et al. |
| 2020/0017143 A1 | 1/2020 | Gali |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0406967 A1 | 12/2020 | Yunus et al. |
| 2021/0078634 A1 | 3/2021 | Jalalmaab et al. |
| 2021/0170820 A1 | 6/2021 | Zhang |
| 2021/0170947 A1 | 6/2021 | Yunus et al. |
| 2022/0024391 A1 | 1/2022 | Gali et al. |
| 2022/0027644 A1 | 1/2022 | Gali et al. |
| 2022/0028111 A1 | 1/2022 | Gali et al. |
| 2022/0189052 A1 | 6/2022 | Jalalmaab et al. |

VEHICULAR TRAILERING ASSIST SYSTEM WITH TARGETLESS CALIBRATION OF TRAILER CAMERAS

CROSS REFERENCE TO RELATED APPLICATION

The present application claims the filing benefits of U.S. provisional application Ser. No. 62/953,617, filed Dec. 26, 2019, which is hereby incorporated herein by reference in its entirety.

FIELD OF THE INVENTION

The present invention relates generally to a vehicle trailering assist system for a vehicle and, more particularly, to a vehicle trailering assist system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a trailering assist system for a vehicle that utilizes one or more cameras (preferably one or more CMOS cameras) to capture image data representative of images exterior of the trailer. The system also includes an electronic control unit (ECU) comprising electronic circuitry and associated software, with the electronic circuitry including an image processor operable to process image data captured by the camera. The ECU, as the vehicle and trailer travel along a ground surface during a first stage of a calibration maneuver of the vehicle and trailer, and responsive to image processing at the ECU of multiple frames of image data captured by the at least one camera, determines image coordinates of at least one ground feature relative to the trailer. Responsive to determining the image coordinates of the at least one ground feature relative to the trailer, the ECU, during the first stage of a calibration maneuver of the vehicle and trailer, estimates orientation parameters of the at least one camera based at least on (i) the determined image coordinates of the at least one ground feature relative to the trailer and (ii) known intrinsic camera parameters. As the vehicle and trailer travel further along the ground surface during a second stage of the calibration maneuver of the vehicle and trailer, and based on the estimated orientation parameters of the at least one camera determined during the first stage of the calibration maneuver, the ECU determines location of the at least one camera at the trailer.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or maneuver assist system and/or driving assist system operates to capture images exterior of the vehicle and a trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more cameras and may provide an output to a display device for displaying images representative of the captured image data. Optionally, the system may provide display, such as a rearview display or a top down or bird's eye or surround view display or the like.

Figure 1:
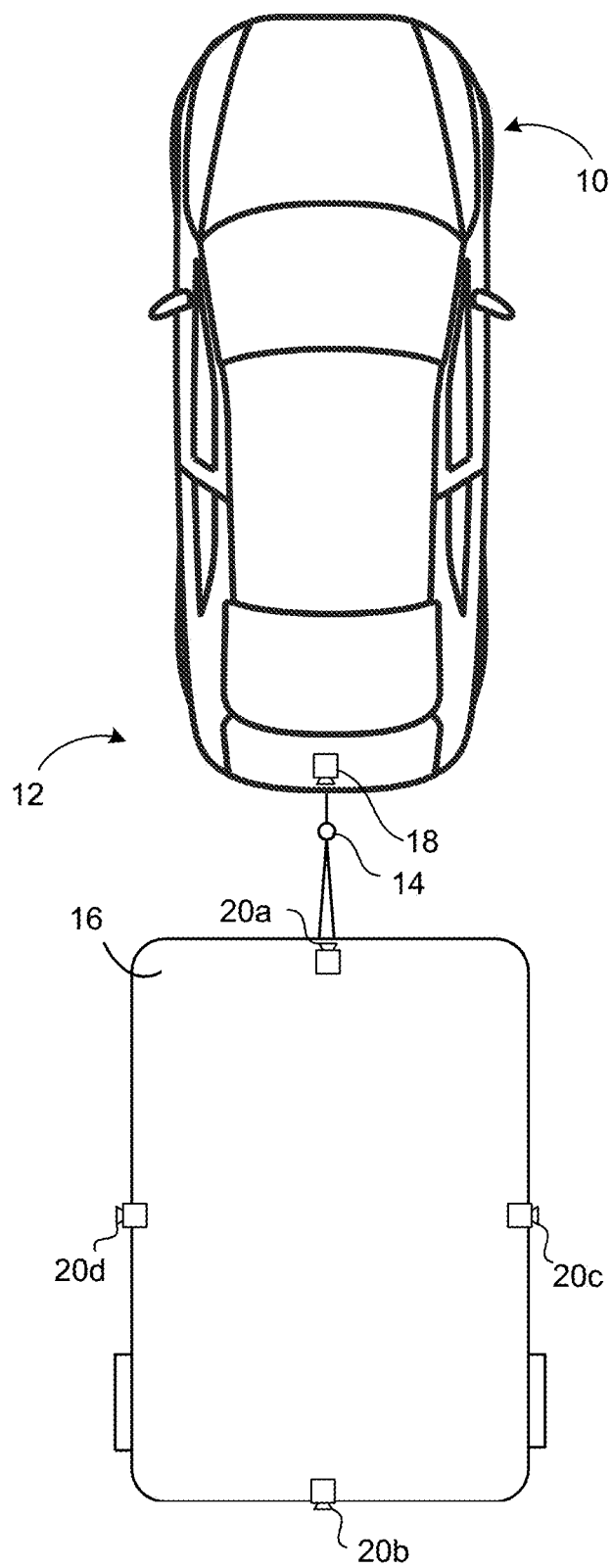
FIG. 1 is a plan view of a vehicle with a trailering assist system that is operable to steer a trailer along a trailer direction in accordance with the present invention.

Referring now to the drawings and the illustrative embodiments depicted therein, a vehicle 10 includes a trailer maneuver assist system 12 that is operable to assist in backing up or reversing with a hitched trailer via, for example, a hitch 14 and may maneuver the vehicle 10 and trailer 16 toward a desired or selected location. The trailer maneuver assist system 12 may include at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10, which includes the hitch 14 and/or trailer 16 (with a coupler of a trailer tongue of the trailer hitched at the hitch to form a pivoting connection of the trailer to the vehicle), with the camera 18 having a lens for focusing images at or onto an imaging array or imaging plane or imager of the camera 18 (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like).

Figure 2:
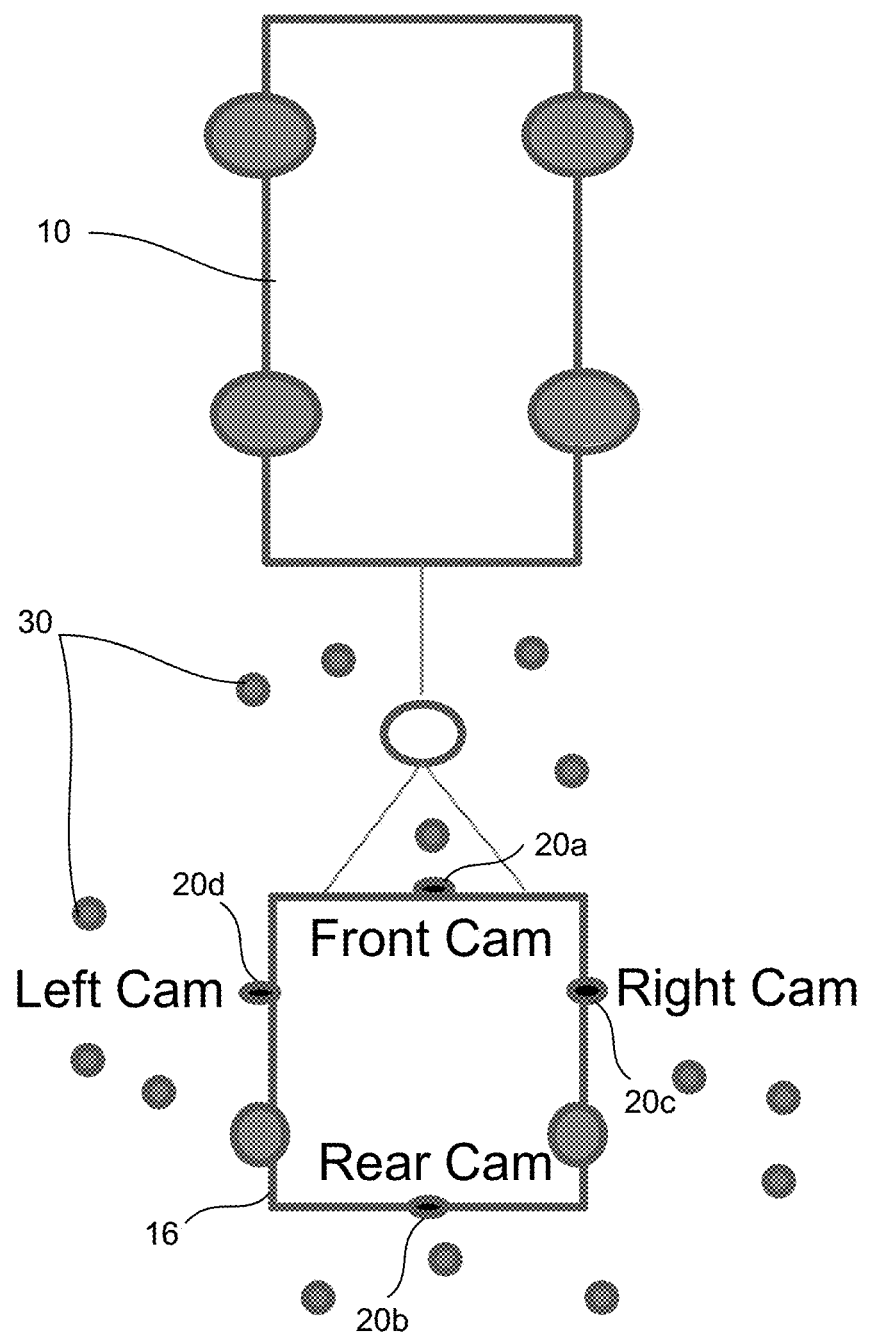
FIG. 2 is a plan view of ground feature points captured by one or more cameras of the trailer.

The trailer 16 may include one or more cameras 20, which may include a forward viewing camera 20a, a rear viewing camera 20b, a right viewing camera 20c, and a left viewing camera 20d (FIG. 2). The trailer maneuver assist system 12 includes a control or electronic control unit (ECU) having electronic circuitry and associated software, with the electronic circuitry including a data processor or image processor that is operable to process image data captured by the one or more cameras 20 for detecting objects or the like and/or for providing displayed images at a display device for viewing by the driver of the vehicle 10 (the control and/or display device may be part of or incorporated in or at an interior rearview mirror assembly of the vehicle 10, or the control and/or the display device may be disposed elsewhere at or in the vehicle 10). The data transfer or signal communication from the one or more cameras 20 to the ECU may comprise any suitable data or communication link, such as a vehicle network bus or the like of the equipped vehicle 10.

In accordance with an aspect of the present invention, the trailer maneuver assist system 12 performs targetless calibration of one or more cameras 20 (e.g., four cameras) installed at the trailer 16. For example, the system 12 may estimate deviation of rotation angles, heights and locations of the cameras 20 on the trailer's body, etc., and based at least in part on such estimations, the system 12 may adjust processing of image data captured by the cameras 20 to accommodate the estimated deviations. The system 12 may receive image coordinates of ground features 30 (FIG. 2) and three dimensional (3D) features 32 (FIG. 3) matched throughout a number of frames and information of trailer kinematics (i.e., the distance traveled by the trailer's center of gravity between frames and the trailer yaw angle rate which indicates how much the trailer rotates with respect to the vehicle 10 between frames). The system 12 may also receive information on the location of the cameras 20 on the trailer's body (i.e., the Cartesian coordinates or X and Y coordinates of the cameras 20 with respect to the trailer's frame of reference). The system 12 may also receive intrinsic camera parameters, (e.g., focal lengths, optical center coordinates, and coefficients of a polynomial used to unwarp the fisheye cameras' images). The system 12 may calibrate one or more of the cameras 20 during driving maneuvers that include straight driving with occasional turns.

Figure 3:
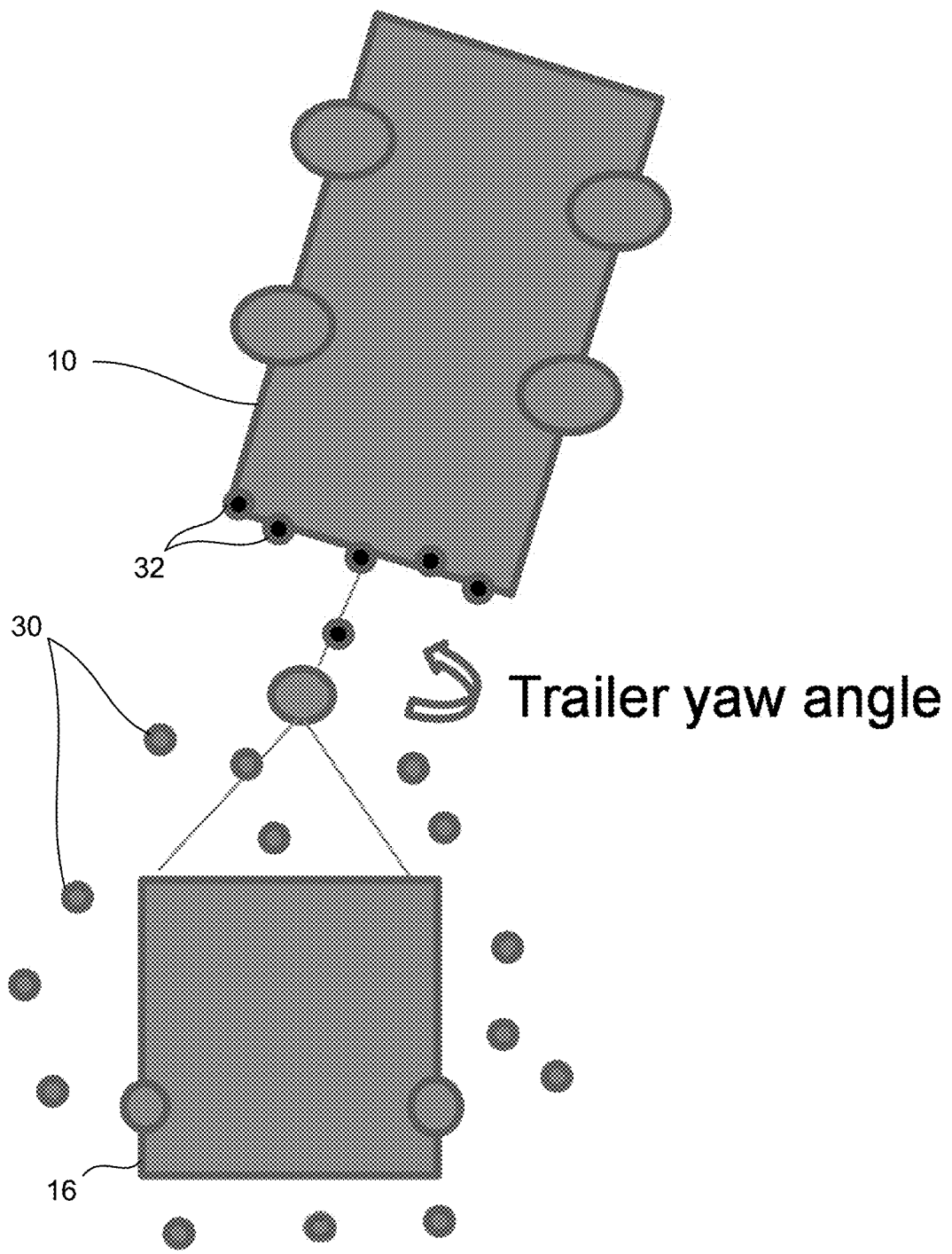
FIG. 3 is a plan view of ground feature points and three dimensional features located on a hitch bar of body of the vehicle.

Referring now to FIGS. 2 and 3, the system 12 may perform camera calibration in two consecutive stages: first with straight line motion of the vehicle 10 and trailer 16, and second with motion with maneuvers (including turning of the vehicle wheels to turn the vehicle 10 and trailer 16). During the first stage of straight line motion, the system 12 may, for each camera 20, obtain image coordinates of ground features 30 detected and matched throughout several frames of captured image data (FIG. 2). The system 12 may, using the ground feature image point coordinates and known intrinsic camera parameters, use projective geometry framework to estimate camera orientation parameters such as rotation angles, yaw, and pitch and roll (with the camera yaw, camera pitch and camera roll being relative to the respective coordinate systems of the individual cameras). That is, the camera yaw of the camera is a rotation of the camera about a vertical axis through the camera, the camera pitch of the camera is a rotation of the camera about a horizontal axis through the camera, and the camera roll of the camera is a rotation of the camera about a longitudinal axis of the lens barrel of the camera. The system 12 may use trailer kinematics information to estimate a height of one or more of the cameras relative to the ground.

Optionally, the system 12 may perform additional steps for the front camera 20a as a lack of ground features 30 may occur due to obstruction of view by the hitch bar and tongue. That is, the hitch bar and/or tongue (or other portions of the trailer 16 and/or vehicle 10) may obstruct the view of ground feature points 30 for the front viewing camera 20a. In this situation, the system 12 may detect and match 3D features 32 located on the hitch bar and the body of the vehicle 10 when the trailer performs turns with respect to the vehicle 10 (FIG. 3). The system 12 may determine changes in the feature locations in subsequent frames of image data during the trailer's maneuvers. The system 12 may estimate a virtual rotation matrix of the camera 20 between frames. The system 12 may assume that the camera 20 moves and the features are motionless as opposed to the features moving and the camera 20 being motionless (which is generally what is actually happening). Using the virtual rotation matrix, the system 12 may perform a nonlinear optimization to optimize/refine/update the estimated yaw, pitch and roll of the front camera 20a estimated previously and the vehicle and/or trailer yaw rate obtained from the trailer kinematics.

During the second stage when the vehicle 10 is performing maneuvers (e.g., turns), the system 12 may, for each camera 20, use calibration angles and camera height obtained during stage 1 and trailer kinematics and image coordinates of detected and matched features to obtain the location (i.e., the X and Y coordinates) of the camera 20 with respect a chosen coordinate system associated with the trailer 16. The system 12 may use the coordinates to calibrate the cameras 20. For example, the system 12 may compare the determined or estimated coordinates with expected coordinates or previous coordinates and adjust processing of image data captured by the cameras 20 to accommodate any determined offset or error or difference between the determined or estimated coordinates and the expected or previous coordinates.

Thus, the trailer maneuver assist system 12 of the present invention may calibrate one or more cameras disposed at a trailer hitched to a vehicle without the use of targets. The system may obtain and process image data captured by each of the cameras of the trailer and determine and track feature points across two or more frames of captured image data. Using the feature points, trailer kinematics information, and intrinsic camera parameters, the system determines or estimates camera rotation angles (camera yaw, camera pitch, camera roll) and camera height. Thus, the camera obtains accurate estimations of location, height, and rotation angles or orientation of each camera of the trailer and may compensate the processing accordingly. For example, an object detection system may accurately determine a position of an object relative to the trailer and/or relative to the vehicle based on the calibration information and processing adjustment. As another example, a trailer assist system may generate surround view images based on the calibration information and image data captured by a plurality of trailer cameras. That is, the system determines or estimates misalignment or offset from expected location/orientation of a calibrated trailer camera and adjusts processing of frames of image data captured by the at least one camera to accommodate or compensate for misalignment of the at least one camera at the trailer from the expected location/orientation.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,532,698; 10,552,976; 10,160,382; 10,086,870; 9,558,409; 9,446,713; 9,085,261 and/or 6,690,268, and/or U.S. Publication Nos. US-2020-0361397; US-2020-0356788; US-2020-0334475; US-2020-0017143; US-2019-0118860; US-2019-0064831; US-2019-0039649; US-2018-0276838; US-2018-0215382 and/or US-2017-0254873, and/or U.S. patent application Ser. No. 17/115,826, filed Dec. 9, 2020, Ser. No. 17/247,220, filed Dec. 4, 2020, Ser. No. 16/948,253, filed Sep. 10, 2020, and/or Ser. No. 16/946,542, filed on Jun. 26, 2020, and/or U.S. provisional applications, Ser. No. 63/199,155, filed Dec. 10, 2020, Ser. No. 62/705,968, filed Jul. 24, 2020, Ser. No. 62/705,967, filed Jul. 24, 2020, and/or Ser. No. 62/705,966, filed Jul. 24, 2020, and/or International PCT application No. PCT/US20/70911, filed Dec. 16, 2020, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786; 10,071,687; 10,099,614; 9,563,951; 9,491,451; 9,280,202; 9,604,581; 9,508,014; 10,232,797; 9,580,013; 9,327,693; 9,487,159; 10,027,930; 9,688,200; 10,057,544; 10,179,543; 9,445,057; 9,558,409; 9,481,301; 10,025,994; 9,743,002; 9,307,640; 9,707,896; 9,723,272; 9,446,713; 9,761,142; 9,365,162; 9,340,227; 10,089,537; 9,670,895; 10,457,209; 9,319,637; 10,609,335; 10,182,228; 9,565,342; 9,264,673 and/or 5,786,772, and/or U.S. Publication Nos. US-2014-0327772; US-2014-0218535; US-2014-0218535; US-2014-0211009; US-2014-0168437; US-2014-0168415; US-2014-0025240; US-2014-0028852; US-2014-0005907; US-2013-0215271 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the system may include a display for displaying images captured by one or more of the imaging sensors for viewing by the driver of the vehicle while the driver is normally operating the vehicle. Optionally, for example, the system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252; 9,598,016; 9,264,672 and/or 6,642,851, and/or U.S. Publication Nos. US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the vehicular trailering assist system comprising:

at least one camera disposed at a trailer hitched to a hitch ball of a vehicle equipped with the vehicular trailering assist system to form a pivoting joint hitch connection of the trailer to the vehicle, the at least one camera viewing exterior of the trailer hitched to the hitch ball of the vehicle, wherein the at least one camera captures frames of image data;

an electronic control unit (ECU) comprising electronic circuitry and associated software, wherein the electronic circuitry comprises an image processor operable to process frames of image data captured by the at least one camera;

wherein the ECU, as the vehicle and trailer travel along a ground surface during a first stage of a calibration maneuver of the vehicle and trailer, and responsive to image processing at the ECU of multiple frames of image data captured by the at least one camera, determines image coordinates of at least one ground feature relative to the trailer;

wherein, responsive to determining the image coordinates of the at least one ground feature relative to the trailer, the ECU, during the first stage of a calibration maneuver of the vehicle and trailer, estimates orientation parameters of the at least one camera based at least on (i) the determined image coordinates of the at least one ground feature relative to the trailer and (ii) known intrinsic camera parameters; and wherein, as the vehicle and trailer travel further along the ground surface during a second stage of the calibration maneuver of the vehicle and trailer, and based on the estimated orientation parameters of the at least one camera determined during the first stage of the calibration maneuver, the ECU determines location of the at least one camera at the trailer.

2. The vehicular trailering assist system of claim 1, wherein, responsive to determining the location of the at least one camera at the trailer, the ECU adjusts processing of frames of image data captured by the at least one camera to accommodate for misalignment of the at least one camera at the trailer.

3. The vehicular trailering assist system of claim 1, wherein the estimated orientation parameters of the at least one camera comprise (i) a rotation angle of the at least one camera relative to the trailer about a respective vertical axis of the at least one camera, (ii) a rotation angle of the at least one camera relative to the trailer about a respective horizontal axis of the at least one camera and (iii) a rotation angle of the at least one camera relative to the trailer about a respective longitudinal axis of a lens barrel of the at least one camera.

4. The vehicular trailering assist system of claim 1, wherein the at least one camera comprises four cameras.

5. The vehicular trailering assist system of claim 1, wherein the ECU, during the first stage of the calibration maneuver, determines the image coordinates of the at least one ground feature relative to the trailer while the vehicle and trailer travel in a straight line, and wherein the ECU, during the second stage of the calibration maneuver, determines the location of the at least one camera at the trailer while the vehicle and trailer travel along a curve.

6. The vehicular trailering assist system of claim 1, wherein, responsive to determining the image coordinates of the at least one ground feature relative to the trailer, the ECU tracks the at least one ground feature in at least one subsequent frame of captured image data.

7. The vehicular trailering assist system of claim 1, wherein the known intrinsic camera parameters of the at least one camera comprise at least one selected from the group consisting of (i) focal length, (ii) optical center coordinates, (iii) and coefficients of a polynomial used to unwarp image data.

8. The vehicular trailering assist system of claim 1, wherein the ECU estimates the orientation parameters of the at least one camera using projective geometry.

9. The vehicular trailering assist system of claim 1, wherein the ECU estimates a height of the at least one camera relative to the ground surface based on trailer kinematics information.

10. The vehicular trailering assist system of claim 1, wherein the at least one camera comprises a front camera disposed at the front of the trailer, and wherein the ECU, responsive to image processing of frames of image data captured by the front camera, determines image coordinates of a three dimensional (3D) feature located at one selected from the group consisting of (i) a hitch of the vehicle and (ii) a body of the vehicle.

11. The vehicular trailering assist system of claim 10, wherein the ECU, responsive to determining the image coordinates of the 3D feature, estimates a virtual rotation matrix of the front camera, and wherein the ECU, responsive to estimating the virtual rotation matrix, performs a nonlinear optimization to optimize parameters of the front camera, and wherein the parameters of the front camera comprise rotation angles of the front camera.

12. The vehicular trailering assist system of claim 11, wherein the rotation angles of the front camera comprise (i) rotation of the front camera relative to the trailer about a vertical axis of the front camera, (ii) rotation of the front camera relative to the trailer about a horizontal axis of the front camera and (iii) rotation of the front camera relative to the trailer about a longitudinal axis of a lens barrel of the front camera.

13. The vehicular trailering assist system of claim 12, wherein the ECU determines an initial estimate for the parameters of the front camera based on trailer kinematics.

14. A vehicular trailering assist system, the vehicular trailering assist system comprising:

at least one camera disposed at a trailer hitched to a hitch ball of a vehicle equipped with the vehicular trailering assist system to form a pivoting joint hitch connection of the trailer to the vehicle, the at least one camera viewing exterior of the trailer hitched to the hitch ball of the vehicle, wherein the at least one camera captures frames of image data;

an electronic control unit (ECU) comprising electronic circuitry and associated software, wherein the electronic circuitry comprises an image processor operable to process frames of image data captured by the at least one camera;

wherein the ECU, as the vehicle and trailer travel along a ground surface during a first stage of a calibration maneuver of the vehicle and trailer, and responsive to image processing at the ECU of multiple frames of image data captured by the at least one camera, determines image coordinates of at least one ground feature relative to the trailer;

wherein, responsive to determining the image coordinates of the at least one ground feature relative to the trailer, the ECU, during the first stage of a calibration maneuver of the vehicle and trailer, estimates orientation parameters of the at least one camera based at least on (i) the determined image coordinates of the at least one ground feature relative to the trailer and (ii) known intrinsic camera parameters;

wherein the estimated orientation parameters of the at least one camera comprise (i) a rotation angle of the at least one camera relative to the trailer about a respective vertical axis of the at least one camera, (ii) a rotation angle of the at least one camera relative to the trailer about a respective horizontal axis of the at least one camera and (iii) a rotation angle of the at least one camera relative to the trailer about a respective longitudinal axis of a lens barrel of the at least one camera;

wherein, as the vehicle and trailer travel further along the ground surface during a second stage of the calibration maneuver of the vehicle and trailer, and based on the estimated orientation parameters of the at least one camera determined during the first stage of the calibration maneuver, the ECU determines location of the at least one camera at the trailer; and wherein, responsive to determining the location of the at least one camera at the trailer, the ECU adjusts processing of frames of image data captured by the at least one camera to accommodate for misalignment of the at least one camera at the trailer.

15. The vehicular trailering assist system of claim 14, wherein the at least one camera comprises four cameras.

16. The vehicular trailering assist system of claim 14, wherein the ECU, during the first stage of the calibration maneuver, determines the image coordinates of the at least one ground feature relative to the trailer while the vehicle and trailer travel in a straight line, and wherein the ECU, during the second stage of the calibration maneuver, determines the location of the at least one camera at the trailer while the vehicle and trailer travel along a curve.

17. The vehicular trailering assist system of claim 14, wherein the known intrinsic camera parameters of the at least one camera comprise at least one selected from the group consisting of (i) focal length, (ii) optical center coordinates, (iii) and coefficients of a polynomial used to unwarp image data.

18. A vehicular trailering assist system, the vehicular trailering assist system comprising:

at least one camera disposed at a trailer hitched to a hitch ball of a vehicle equipped with the vehicular trailering assist system to form a pivoting joint hitch connection of the trailer to the vehicle, the at least one camera viewing exterior of the trailer hitched to the hitch ball of the vehicle, wherein the at least one camera captures frames of image data;

an electronic control unit (ECU) comprising electronic circuitry and associated software, wherein the electronic circuitry comprises an image processor operable to process frames of image data captured by the at least one camera;

wherein the ECU, as the vehicle and trailer travel along a ground surface during a first stage of a calibration maneuver of the vehicle and trailer, and responsive to image processing at the ECU of multiple frames of image data captured by the at least one camera, determines image coordinates of at least one ground feature relative to the trailer;

wherein, responsive to determining the image coordinates of the at least one ground feature relative to the trailer, the ECU, during the first stage of a calibration maneuver of the vehicle and trailer, estimates orientation parameters of the at least one camera based at least on (i) the determined image coordinates of the at least one ground feature relative to the trailer and (ii) known intrinsic camera parameters;

wherein the estimated orientation parameters of the at least one camera comprise (i) a rotation angle of the at least one camera relative to the trailer about a respective vertical axis of the at least one camera, (ii) a rotation angle of the at least one camera relative to the trailer about a respective horizontal axis of the at least one camera and (iii) a rotation angle of the at least one camera relative to the trailer about a respective longitudinal axis of a lens barrel of the at least one camera;

wherein the known intrinsic camera parameters of the at least one camera comprise at least one selected from the group consisting of (i) focal length, (ii) optical center coordinates, (iii) and coefficients of a polynomial used to unwarp image data; and wherein, as the vehicle and trailer travel further along the ground surface during a second stage of the calibration maneuver of the vehicle and trailer, and based on the estimated orientation parameters of the at least one camera determined during the first stage of the calibration maneuver, the ECU determines location of the at least one camera at the trailer.

19. The vehicular trailering assist system of claim 18, wherein the ECU estimates the orientation parameters of the at least one camera using projective geometry.

20. The vehicular trailering assist system of claim 18, wherein the ECU estimates a height of the at least one camera relative to the ground surface based on trailer kinematics information.

* * * * *